United States Patent
Aquila et al.

(10) Patent No.: US 12,030,558 B2
(45) Date of Patent: Jul. 9, 2024

(54) MULTI-PLATFORM RECONFIGURABLE ELECTRIC VEHICLE

(71) Applicant: Canoo Technologies Inc., Torrance, CA (US)

(72) Inventors: Anthony Aquila, Justin, TX (US); Richard Kim, Los Angeles, CA (US); Jackson E. Luttig, Rancho Palos Verdes, CA (US); Arthur Henrique Martins Junior, Los Angeles, CA (US); Mark Smith, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 260 days.

(21) Appl. No.: 17/691,036

(22) Filed: Mar. 9, 2022

(65) Prior Publication Data

US 2022/0289312 A1 Sep. 15, 2022

Related U.S. Application Data

(60) Provisional application No. 63/159,407, filed on Mar. 10, 2021.

(51) Int. Cl.
  *B62D 33/027* (2006.01)
  *B60N 3/00* (2006.01)
  *B60R 5/02* (2006.01)

(52) U.S. Cl.
  CPC ......... *B62D 33/0273* (2013.01); *B60N 3/001* (2013.01); *B60R 5/02* (2013.01); *B60Y 2200/14* (2013.01); *B60Y 2200/91* (2013.01)

(58) Field of Classification Search
  CPC ...... B60N 3/00; B62D 33/0273; B60R 90/00; B60R 90/02

(Continued)

(56) References Cited

U.S. PATENT DOCUMENTS

| | | | |
|---|---|---|---|
| 4,917,430 A | * | 4/1990 | Lawrence ................ B60R 9/02 224/281 |
| 5,125,710 A | | 6/1992 | Gianelo |

(Continued)

FOREIGN PATENT DOCUMENTS

EP  1215107 A1  6/2002

OTHER PUBLICATIONS

International Search Report and Written Opinion of the International Searching Authority dated Jun. 9, 2022, in connection with International Application No. PCT/US2022/019842, 12 pages.

*Primary Examiner* — Jose V Chen

(57) ABSTRACT

A vehicle body for a multi-platform, reconfigurable electric truck includes a front trunk, an extendable bed and barn door tailgates, a sidewall table, and a side step and drawer. The front trunk includes a cover movable between a closed and open positions, and includes panels selectively movable between a retracted and extended positions to form a work surface. A bed extender slides between a retracted and extended positions. Barn door tailgates each move between closed, partially open, and fully open positions and include inner tailgates movable between stowed and deployed positions. The barn door tailgates and the inner tailgates enclose an extended region of a bed when the bed extender is extended position, the barn door tailgates are each partially open, and the inner tailgates are each deployed. The sidewall table folds down from a sidewall, and the drawer pulls out from a sidewall.

20 Claims, 16 Drawing Sheets

(58) Field of Classification Search
USPC .......................................................... 108/44
See application file for complete search history.

(56) References Cited

U.S. PATENT DOCUMENTS

| | | | | |
|---|---|---|---|---|
| 5,267,773 | A * | 12/1993 | Kalis, Jr. ................ | B60R 11/06 296/183.1 |
| 5,498,049 | A * | 3/1996 | Schlachter .............. | B60R 11/06 224/543 |
| 5,518,158 | A * | 5/1996 | Matlack ............. | B62D 33/0273 224/403 |
| 5,533,774 | A * | 7/1996 | Cavanaugh .......... | B60N 2/3095 297/14 |
| 5,567,000 | A * | 10/1996 | Clare ..................... | B60R 11/06 296/183.1 |
| 5,895,086 | A * | 4/1999 | Carico ................... | B60R 11/06 296/37.6 |
| 6,007,130 | A * | 12/1999 | Clare ...................... | B60J 10/24 188/274 |
| 7,219,941 | B1 * | 5/2007 | San Paolo ................ | B60R 9/00 224/404 |
| 7,290,820 | B1 * | 11/2007 | Smith ................... | B60R 13/011 296/37.6 |
| 7,575,264 | B1 | 8/2009 | Solomon | |
| 9,821,720 | B1 * | 11/2017 | McCauley ............... | B60P 7/00 |
| 10,974,653 | B2 * | 4/2021 | Scaringe ................. | B60R 5/00 |
| 2006/0087141 | A1 * | 4/2006 | Bruford .................. | B60R 3/02 296/37.1 |
| 2006/0119134 | A1 * | 6/2006 | Dean ................. | B62D 33/0273 296/182.1 |
| 2006/0219746 | A1 * | 10/2006 | Kniffel ..................... | B60R 9/00 224/404 |
| 2008/0191506 | A1 * | 8/2008 | Huotari ................. | A47B 37/00 224/404 |
| 2009/0026786 | A1 * | 1/2009 | Reich ....................... | B60R 9/00 296/37.6 |
| 2009/0096239 | A1 * | 4/2009 | Martin ..................... | B60R 9/00 296/37.6 |
| 2009/0101422 | A1 * | 4/2009 | Subramanian ........... | B60K 6/48 296/187.01 |
| 2009/0195007 | A1 * | 8/2009 | Miller ...................... | B60P 3/40 296/26.11 |
| 2016/0214657 | A1 * | 7/2016 | Topolovec ........... | B62D 33/037 |
| 2017/0282979 | A1 * | 10/2017 | Singer ................... | B62D 21/14 |
| 2017/0310133 | A1 | 10/2017 | Bickley | |
| 2020/0100622 | A1 | 4/2020 | Collins et al. | |
| 2020/0130586 | A1 * | 4/2020 | Hoffman .................. | B60K 1/00 |
| 2020/0139894 | A1 * | 5/2020 | Glickman ................ | B60R 5/02 |
| 2021/0053498 | A1 | 2/2021 | Howard, II et al. | |
| 2021/0086702 | A1 * | 3/2021 | Christensen ............. | B60R 3/02 |
| 2021/0155164 | A1 * | 5/2021 | Symonds ............ | B62D 33/023 |
| 2021/0188368 | A1 * | 6/2021 | Williams ................. | B60P 3/40 |
| 2021/0261064 | A1 * | 8/2021 | Reed, Sr. ................ | B60Q 1/32 |
| 2021/0300226 | A1 * | 9/2021 | Burggraf ................. | B60N 3/001 |
| 2022/0119045 | A1 * | 4/2022 | Horner ................. | B62D 33/027 |
| 2023/0103570 | A1 * | 4/2023 | Mack ..................... | B62D 25/24 296/37.5 |
| 2023/0256887 | A1 * | 8/2023 | Harmon ................... | B60R 9/02 224/404 |
| 2023/0256891 | A1 * | 8/2023 | Harmon ................. | B60R 11/06 296/26.08 |
| 2023/0257034 | A1 * | 8/2023 | Harmon ................. | B62D 33/08 296/26.09 |
| 2023/0286448 | A1 * | 9/2023 | Rumph .................. | B60N 3/001 |

* cited by examiner

MULTI-PLATFORM RECONFIGURABLE ELECTRIC VEHICLE

CROSS-REFERENCE TO RELATED APPLICATIONS AND PRIORITY CLAIM

This application claims priority to U.S. Provisional Patent Application No. 63/159,407 filed Mar. 10, 2021. The content of the above-identified patent document(s) is incorporated herein by reference.

TECHNICAL FIELD

This disclosure relates generally to electric vehicles. More specifically, this disclosure relates to a multi-platform, reconfigurable electric pick-up truck.

BACKGROUND

Automobiles, or vehicles, are typically categorized into a number of different categories, including: passenger, sedan, coupe, sports-utility vehicle (SUV), cross-over, pick-up truck, van, cargo vehicle, and the like. The vehicles can be designed and built for particular use applications. For example, cargo vans, such as American cargo vans, are vans used to transport cargo, or other items, that are smaller and cheaper to operate than a full-sized delivery trucks. Trucks and cargo vans are typically referred to by their carrying weight capacity. Although the carrying capacity of the cargo vans no longer correlate to the common names, trucks and cargo vans are often referred to as ½ ton, ¾ ton and 1.5 ton.

Traditionally, automobiles required a petroleum-based fuel, such as gasoline, to operate via ignition in an internal combustion engine (ICE). Recently, due to concerns over gasoline prices or shortages, or due to ecological concerns, many consumers and operators of the vehicles have sought vehicles that operate on alternate power sources, such as electricity. Electric vehicles now comprise a growing market and are expected to surpass ICE vehicle sales within the next five to ten years. Most electric vehicles are limited to passenger vehicles, such as coups or sedans, or mopeds. As demands for electric vehicles increase, more types of different electric vehicles are required.

SUMMARY

This disclosure relates to a multi-platform, reconfigurable electric truck.

In certain embodiments, a vehicle body for a multi-platform, reconfigurable electric truck includes a front trunk, an extendable bed and barn door tailgates, a sidewall table, and a side step and drawer. The front trunk may include a cover selectively movable between a closed position and an open position, where the cover includes panels on a surface of the cover, each of the panels selectively movable between a retracted position and an extended position, wherein the cover and the panels form a work surface. The extendable bed may comprise a bed extender slidable between a retracted position and an extended position, and the barn door tailgates may each be selectively movable between each of a closed position, a partially open position, and a fully open position. The bar door tailgates may each comprise an inner tailgate selectively movable between a stowed position and a deployed position. The barn door tailgates and the inner tailgates enclose an extended region of a bed when the bed extender is in the extend position, the barn door tailgates are each in the partially open position, and the inner tailgates are each in the deployed position. The sidewall table may be formed by a portion of a sidewall of a bed for the vehicle, the sidewall portion selectively movable between a closed position oriented in alignment with the sidewall and an open position extending outward from the sidewall to form a work surface. The sidewall portion may comprise hinged segments are configured to be selectively unfolded to form an enlarged work surface. The side step and drawer may comprise a drawer configured to be selectively pulled out from a sidewall of a bed for the vehicle, the drawer including a retractable cover forming a step surface and covering storage space within the drawer.

In some embodiment, a front trunk for a vehicle body includes a storage space located at a front of the vehicle body, and a cover selectively movable between a closed position and an open position, the cover comprising panels on a surface of the cover, each of the panels selectively movable between a retracted position and an extended position, wherein the cover and the panels form a work surface. The front trunk may include electrical outlets within a surface of the storage space, or a wireless charging pad on a bottom surface of the storage space. Each of the panels may be individually movable between the retracted position and the extended position. Each of the panels may be motorized.

In some embodiments, a cargo bed for a vehicle body includes a bottom surface extending rearward from a cabin of the vehicle body, sidewalls on side edges of the bottom surface, a bed extender for the bottom surface, and barn door tailgates connected to the sidewalls. The bed extender is slidable between a retracted position and an extended position. Each of the bard door tailgates is selectively movable between each of a closed position, a partially open position, and a fully open position. The barn door tailgates each include an inner tailgate selectively movable between a stowed position and a deployed position. The barn door tailgates and the inner tailgates enclose an extended region of a bed when the bed extender is in the extend position, the barn door tailgates are each in the partially open position, and the inner tailgates are each in the deployed position. The bed extender, in a retracted position, may be positioned below the bottom surface. The bed extender may comprise a pull handle for manual movement between the retracted position and the extended position. The barn door tailgates may each latch in the closed position and stabilize in each of the partially open position and the fully open position. The inner tailgates may be pivotably mounted within the barn door tailgates.

In some embodiments, a vehicle body includes a sidewall of a cargo bed, where a portion of the sidewall is selectively movable between a closed position oriented in alignment with the sidewall and an open position extending outward from the sidewall to form a work surface. The portion of the sidewall may comprise hinged segments configured to be selectively unfolded to form an enlarged work surface.

In some embodiments, a vehicle body includes a drawer retractably mounted within a sidewall of a cargo bed, the drawer configured to be selectively pulled out from the sidewall and including a cover forming a step surface and covering storage space within the drawer. The cover may be retractable. The storage space may be divided into compartments each including a compartment cover.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 16, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

The present disclosure relates to a purpose-built utility (pickup truck) vehicle featuring powered workbenches, tool storage, and a modular expandable bed. The purpose-built electric vehicles (EVs) of the present disclosure utilize a highly versatile platform architecture that may be implemented as a fully-electric pickup truck.

As noted above, a pickup truck is configured to operate from an electric power source. For example, the pickup truck includes an electric drivetrain configured to drive the wheels and an on-board battery pack configured to provide electrical energy to the electric drivetrain. The on-board battery pack is further configured to provide power for all operational components of the vehicle, such as an entertainment system, touchscreen displays, interior and exterior lighting, steering, braking, environmental controls, and the like.

Embodiments of the present disclosure provide for an electric vehicle. The electric vehicle can be configured as a multi-use pickup truck. The electric vehicle includes multiple adjustable panels and surfaces configured to change an operating function, dimension, orientation, or positioning of the panel. One or more of the panels are disposed adjacent to, or in conjunction with, one or more storage compartments. Certain embodiments include a user input device, such as a touchscreen panel, that can be used in combination with a graphical user interface. Certain embodiments include one or more systems configured to receive or detect biometric signals, biometric images, or biometric inputs. Certain embodiments include one or more systems configured to communicate with one or more remote database platforms regarding operating parameters of the electric vehicle.

The electric truck of the present disclosure may include several unique features to help customers do more with their vehicles, described in further detail below.

Figure 1:
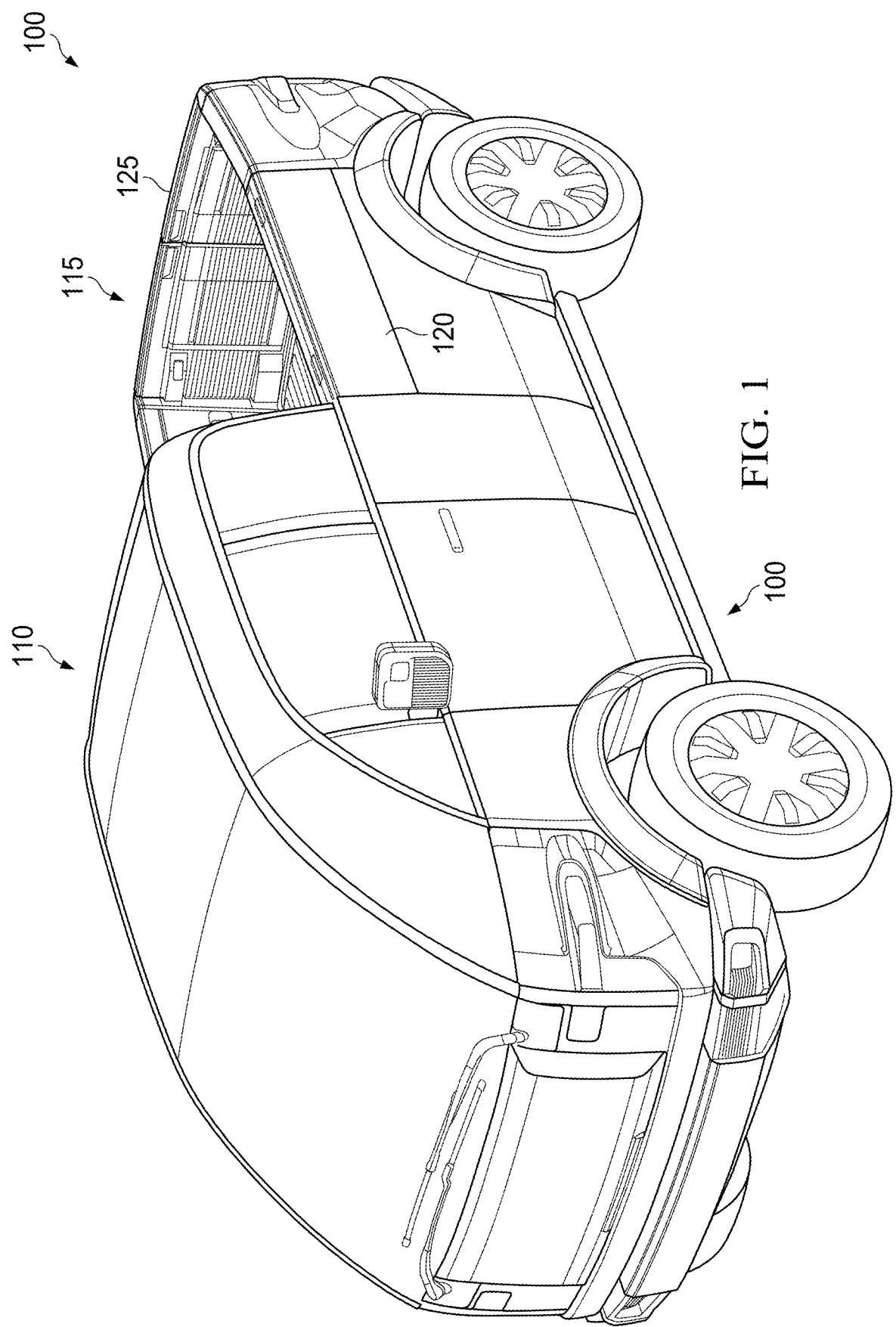
FIG. 1 illustrates an example multi-platform, reconfigurable electric pick-up truck according to embodiments of the present disclosure.

FIG. 1 illustrates an example multi-platform, reconfigurable electric pick-up truck according to embodiments of the present disclosure. The embodiment of the vehicle 100 illustrated in FIG. 1 is for illustration and explanation only. FIG. 1 does not limit the scope of this disclosure to any particular implementation of a vehicle.

In the example illustrated in FIG. 1, the electric vehicle 100 includes a top hat structure coupled to an electric vehicle platform. The platform of vehicle 100 of FIG. 1 includes a chassis (not visible in FIG. 1) supporting a cabin 110 for carrying passengers. In some embodiments, the chassis of the vehicle 100 is in the form of a "skateboard" vehicle platform supporting one or more energy storage elements (such as batteries) that provide input electrical power used by various components of the EV, such as one or more electric motors of the electric vehicle 100 and a control system of the electric vehicle 100 described in further detail below. The top hat structure is designed and dimensioned to have a crew cabin ("cab") 110 and a cargo bed 115. The cabin 110 is configured to provide a space for one or more persons to sit and either operate or ride in the electric vehicle. The cargo bed 415 comprises an open area enclosed by a rear surface of the crew cab 410, side panels 420, and a rear gate 425.

Passengers may enter and exit the cabin 110 through at least one door forming part of the cabin 110. A transparent windshield and other transparent panels mounted within and forming part of the cabin 110 allow at least one passenger (referred to as the "operator," even when the vehicle 100 is operating in an advanced driving or "AD" mode) to see outside the cabin 110. Rear-view mirrors mounted to sides of the cabin 110 enable the operator to see objects to the sides and rear of the cabin 110 and may include warning indicators (such as selectively illuminated warning lights) for features such as blind spot warning (indicating that another vehicle is in the operator's blind spot) and/or lane departure warning.

The cabin 110 is preferably dimensioned to accommodate a vehicle operator and at least one passenger. For example, the cabin 110 can be configured with a driver seat and passenger seat. The cabin 110 can include interior lighting and climate control systems, such as articulating, heated or cooled seats, and air vents coupled to an external source, a cabin heater, and an air condition unit. In certain embodiments, the cabin 110 includes a number of device holders, such as recesses to accommodate a beverage and recesses to accommodate one or more electronic devices. In certain embodiments, one or more of the surfaces or configured to attach various modular components. For example, one or more of the lateral surfaces may include a peg-board grid, webbing, picatinny rails, magnetic, electro-magnetic, hook and loop fasteners, and the like.

In certain embodiments one or more of the cabin 110 or cargo bed 115 includes one or more electrical outlets. The electrical outlets can be 110 volts or 220 volts. For example, a first electrical outlet can be 110 volts while a second electrical outlet is 220 volts. Conventional automobile features such as headlamps, taillights, turn signal indicators, windshield wipers, and bumpers are also depicted. The vehicle 100 may further include cargo storage within or connected to the cabin 110 and mounted on the chassis, and the cargo storage area(s) may optionally be partitioned by dividers from the passenger area(s) of the cabin 110.

The platform, which described in further detail below in connection with FIG. 2, includes a chassis for the top hat structure including the cabin 110 and cargo bed 115. Wheels mounted on axles that are supported by the chassis and driven by the motor(s) via drive gears (all not visible in FIG. 1) allow the vehicle 100 to move smoothly. The wheels are mounted on the axles in a manner permitting rotation relative to a longitudinal centerline of the vehicle 100 for steering and are also connected to steering controls (not visible).

Although FIG. 1 illustrates one example of an electric vehicle 100, those skilled in the art will recognize that the full structure and operation of a suitable vehicle are not depicted in the drawings or described here. Instead, for simplicity and clarity, only the structures and operations necessary for an understanding the present disclosure are depicted and described. Various changes may be made to the example of FIG. 1, and the features described in this disclosure may be used with any other suitable vehicle.

Figure 2:
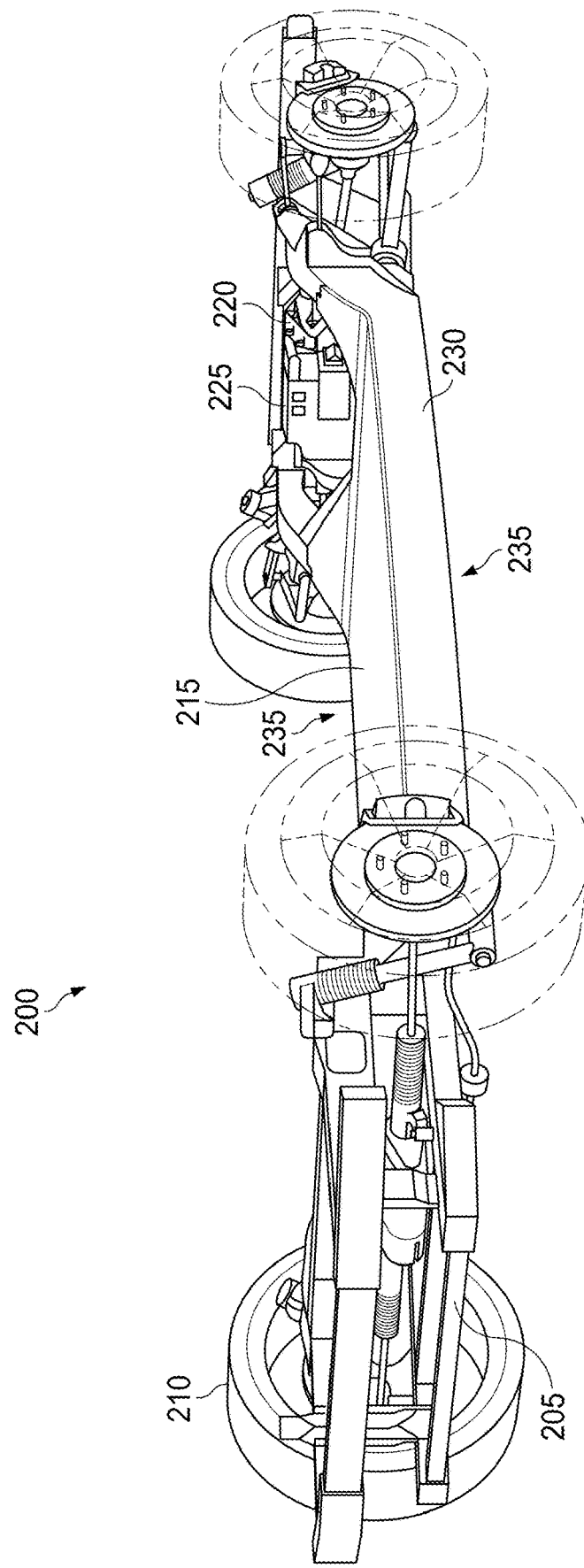
FIG. 2 illustrates an example electric vehicle platform for a multi-platform, reconfigurable electric pick-up truck according to embodiments of the present disclosure.

FIG. 2 illustrates an example electric vehicle platform for a multi-platform, reconfigurable electric pick-up truck according to embodiments of the present disclosure. The embodiment of the vehicle platform 200 illustrated in FIG. 2 is for illustration and explanation only. FIG. 2 does not limit the scope of this disclosure to any particular implementation of a vehicle platform.

According to embodiments of this disclosure, an electric vehicle platform 200 includes a base frame 205. The base frame 205 can include coupling mounts configured to connect wheels 210 to the base frame 205. In some embodiments, the base frame 205 includes a battery pack 215 integrated therein. The electric vehicle platform 200 includes one or more electric drivetrain units, such as a rear drivetrain unit 220 and a front drivetrain unit 225.

The base frame 205 can be made of any suitable material, such as carbon steel, aluminum alloys, and the like. The base frame 205 includes one or more rails 230 that extend laterally along a length of the electric vehicle platform 200. The rails 230 are configured to form lateral edges of a battery compartment or battery containment unit. The base frame 205 can further include one or more panels 235 configured to extend horizontally on top and bottom portions of the rails 230. In certain embodiments, the rails 230 and panels are configured to form the battery compartment integrated into the base frame 205. The battery compartment is further configured to house the components of the battery pack 215.

In certain embodiments, the base frame 205 includes a charger. The charger is coupled to a charging port, which is configured to be selectively coupled to an external power source, such as a wall socket, or electric power connector. The charger can receive alternating current (AC) electrical energy and convert the AC electrical energy into a direct current (DC) electrical energy to charge the battery pack 115.

Although FIG. 2 illustrates one example of an electric vehicle platform 200, various changes may be made to FIG. 2. For example, the electric vehicle platform 200 could include any number of each component in any suitable arrangement. In general, vehicle systems come in a wide variety of configurations, and FIG. 2 does not limit the scope of this disclosure to any particular configuration. Also, while FIG. 2 illustrates one vehicular configuration in which various features disclosed in this patent document can be used, these features could be used in any other suitable system.

Figure 3:
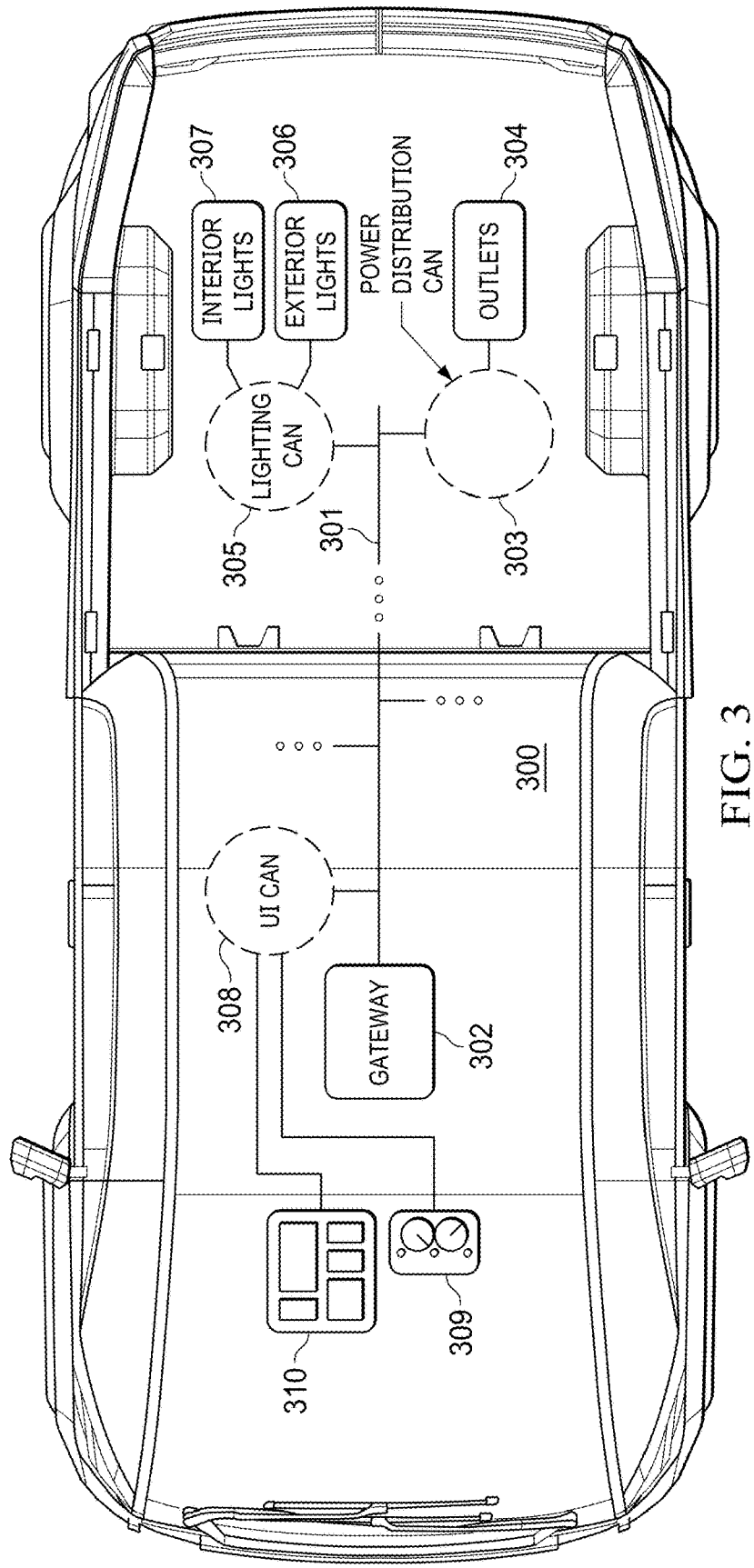
FIGS. 3 and 3A illustrate an example vehicle control system 300 for a multi-platform, reconfigurable electric pick-up truck in accordance with embodiments of the present disclosure.
Figure 3A:
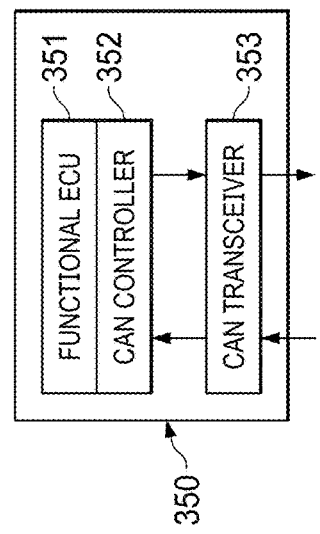

FIGS. 3 and 3A illustrate an example vehicle control system 300 for a multi-platform, reconfigurable electric pick-up truck in accordance with embodiments of the present disclosure. The embodiment of the vehicle control system 300 illustrated in FIGS. 3 and 3A is for illustration and explanation only. FIGS. 3 and 3A do not limit the scope of this disclosure to any particular implementation of a vehicle control system.

The electric vehicle 100 is configured to be operated through the control of a control system 300. The control system 300 is configured to receive inputs from an operator of the vehicle via one or more input interfaces. For example, the operator can interact with a touch screen coupled to the control system 300 and can interact with accelerator and brake pedals and steering wheels.

The electric vehicle 100 can include "fly-by-wire" connections for the steering wheel, accelerator, and brakes. For example, instead of a steering column linkage between the steering wheels and front wheels, the electric vehicle 100 includes a wired or wireless connection for controlling the wheel steering direction in response to movement of the steering wheel. The steering wheel can include a processor and one or more position sensors configured to detect a rotational orientation and movement of the steering wheel. Based on a detected rotational position or movement of the steering wheel, the processor transmits control signals to one or more actuators coupled to the front wheels (or rear wheels if so equipped) to turn or adjust a direction of travel of the respective wheels. In certain embodiments, the control signals are sent directly from the processor (or control system 300) in the steering wheel to the actuators. In certain embodiments, the control signals are sent via the control system 300. Similarly, the brake pedal assembly can include a processor and one or more position sensors configured to detect position movement of the respective pedals and transmits control signals, directly or through the control system 300, to actuators coupled to the brake assemblies to engage in, or release, a braking operation. Additionally, the brake pedal assembly can include a processor and one or more position sensors configured to detect position movement of the respective pedals and transmits control signals directly, or through the control system 300, to the drive train units.

In certain embodiments, the control system 300 is configured to drive the vehicle without operator input. For example, after the control system 300 receives a desired destination, the control system 300 is configured to control the functions of the electric vehicle 100, such as drivetrain, brakes, steering, and lights, to drive the vehicle to the desired destination without further input from the operator or individual that specified the destination. As such, the electric vehicle can be equipped with one or more external cameras and sensors to detect road and traffic conditions, including traffic control devices, such as traffic lights and street signs, to navigate to the desired destination. Additionally, the control system 300 can be equipped with a global positioning system (GPS) and associated navigation software to enable navigation.

FIG. 3 depicts a modern vehicle control system 300 utilizing various electronic control units (ECUs) interconnected on a controller area network (CAN) via the so-called CAN bus. The standard for the CAN bus was released around 1993 by the International Organization for Standardization (ISO) as ISO 11898. The current version of that standard is ISO 11898-1:2015, and the CAN busses described herein may comply with that standard in some embodiments. Each ECU typically includes a printed circuit board (PCB) with a processor or microcontroller integrated circuit coupled to various input sensors, switches, relays, and other output devices. The CAN design permits the ECUs to communicate with each other without the need for a centralized host. Instead, communication takes place on a peer-to-peer basis. The CAN design therefore permits data from sensors and other ECUs to circulate around the vehicle ECUs, with each ECU transmitting sensor and programming information on the CAN bus while simultaneously listening to the CAN bus to pull out data needed to complete tasks being performed by that ECU. There is no central hub or routing system, just a continuous flow of information available to all the ECUs.

By way of example, power doors on a vehicle may be operated by an ECU called the body control module (not shown in FIG. 3). Sensors constantly report whether the doors are open or closed. When the driver pushes a button to close a door, the signal from that switch is broadcast across the CAN bus. When the body control module ECU detects that signal, however, the body control module ECU does not simply close the door. Instead, the body control module ECU first checks the data stream to make sure the vehicle is in park and not moving and, if all is well, gives a command to a power circuit that energizes the motors used to close the door. The body control module ECU may go even further, such as by monitoring the voltage consumed by the motors. If the body control module ECU detects a voltage spike, which happens when a door is hindered by an errant handbag or a wayward body part, the ECU immediately reverses the direction of the door to prevent potential injury. If the door closes properly, the latch electrically locks the door shut, which is an event that may be detected by the body control module ECU.

Notably, vehicle control systems are migrating to higher-speed networks with an Ethernet-like bus for which each ECU is assigned an Internet protocol (IP) address. Among other things, this may allow both centralized vehicle ECUs and remote computers to pass around huge amounts of information and participate in the Internet of Things (IoT).

In the example shown in FIG. 3, the vehicle control system 300 includes a CAN bus 301 embodied or controlled by a gateway ECU 302, which facilitates messages on and among CANs, transmitted and detected by ECUs. FIG. 3 illustrates a power distribution CAN 303 to which an outlets ECU 304 is connected and a lighting CAN 305 to which an exterior lights ECU 306 and an interior lights ECU 307 are connected. The vehicle control system 300 in FIG. 3 also includes a user interface (UI) CAN 308 to which a "dashboard" ECU 309 and a touchscreen ECU 310 are connected. The ECUs 309 and 310 may be integrated with the respective dashboard controls and touchscreen. The UI CAN 308 and the associated dashboard ECU 309 and touchscreen 310 allow the operator to view indicators such as motor temperature. The dashboard ECU 309 may be connected to one or more sensors and one or more indicators other than those on the dashboard, such as the one or more temperature sensors described above.

FIG. 3A illustrates a high level block diagram for the architecture 350 of each CAN depicted in FIG. 3. Each CAN shown in FIG. 3, including the power distribution CAN 303 and lighting CAN 305, includes a functional ECU 351 for the specific function performed by the respective CAN (such as power routing in the case of power distribution CAN 303). The functional ECU 351 is coupled to a CAN controller 352 that controls the interactions of the respective CAN with the other CANs within the vehicle 100 through the gateway ECU 302. A CAN transceiver 353 receives messages from and transmit messages to other CANs under the control of the CAN controller 352.

Although FIGS. 3 and 3A illustrate one example of a vehicle control system 300 for an EV within which cost-effective drive unit lubrication and cooling can be implemented, those skilled in the art will recognize that the full structure and operation of a suitable vehicle control system is not depicted in the drawings or described here. Instead, for simplicity and clarity, only the structures and operations necessary for an understanding the present disclosure are depicted and described. Various changes may be made to the example of FIGS. 3 and 3A, and the features described in this disclosure may be used with any other suitable vehicle control system.

Fold Down Worktable+Cargo Storage: To offer the greatest customer utility, the pickup features a front cargo storage area that can hold tools or gear, and also includes a fold down worktable with electrical outlets. The workstation table is extendable to allow customers to have maximized work surface on the go, in addition to providing an area to put on gear before heading out exploring.

Figure 4:
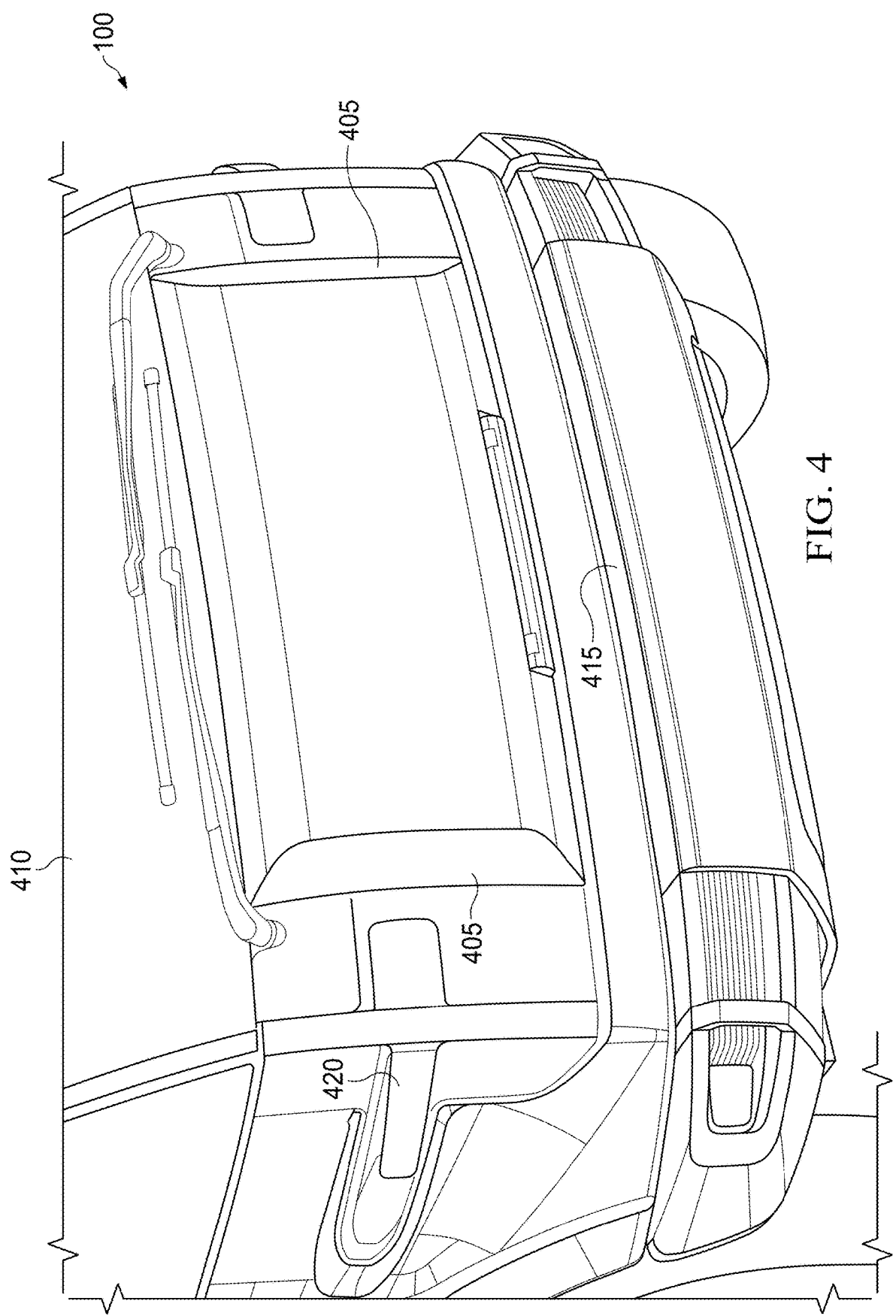
FIGS. 4-6 illustrate front cargo storage with a fold-down worktable on an electric vehicle according to embodiments of the present disclosure.
Figure 5:
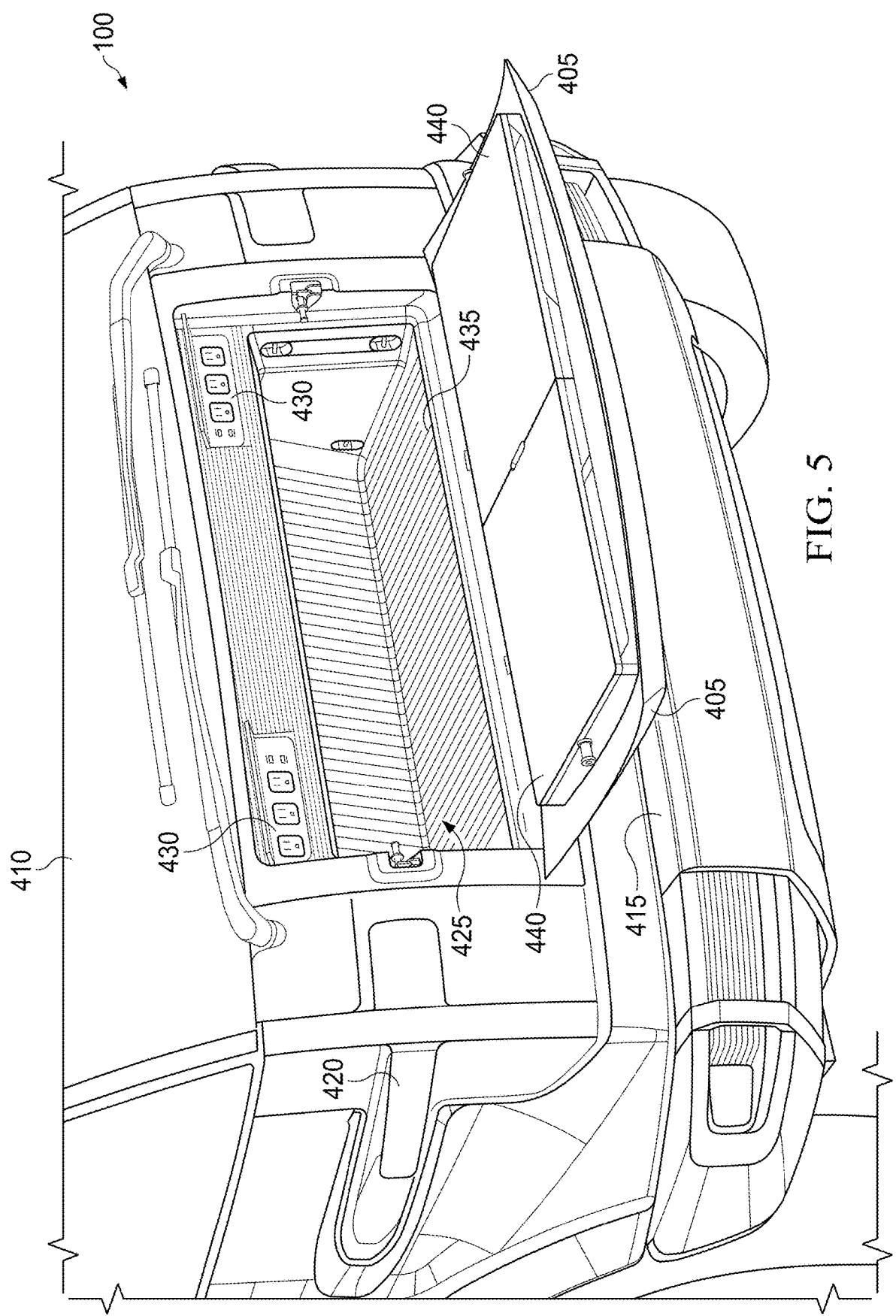
Figure 6:
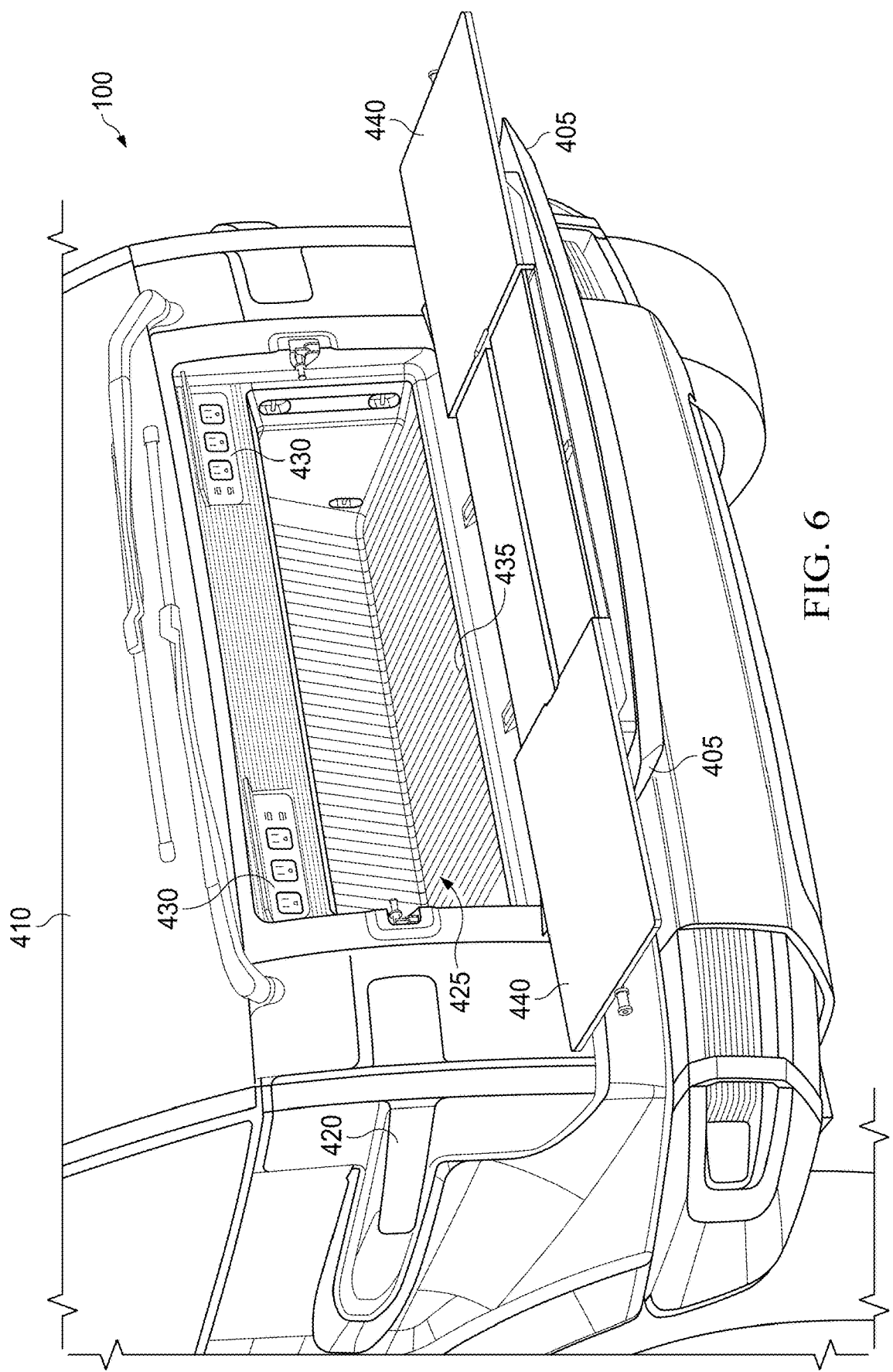
Figure 7:
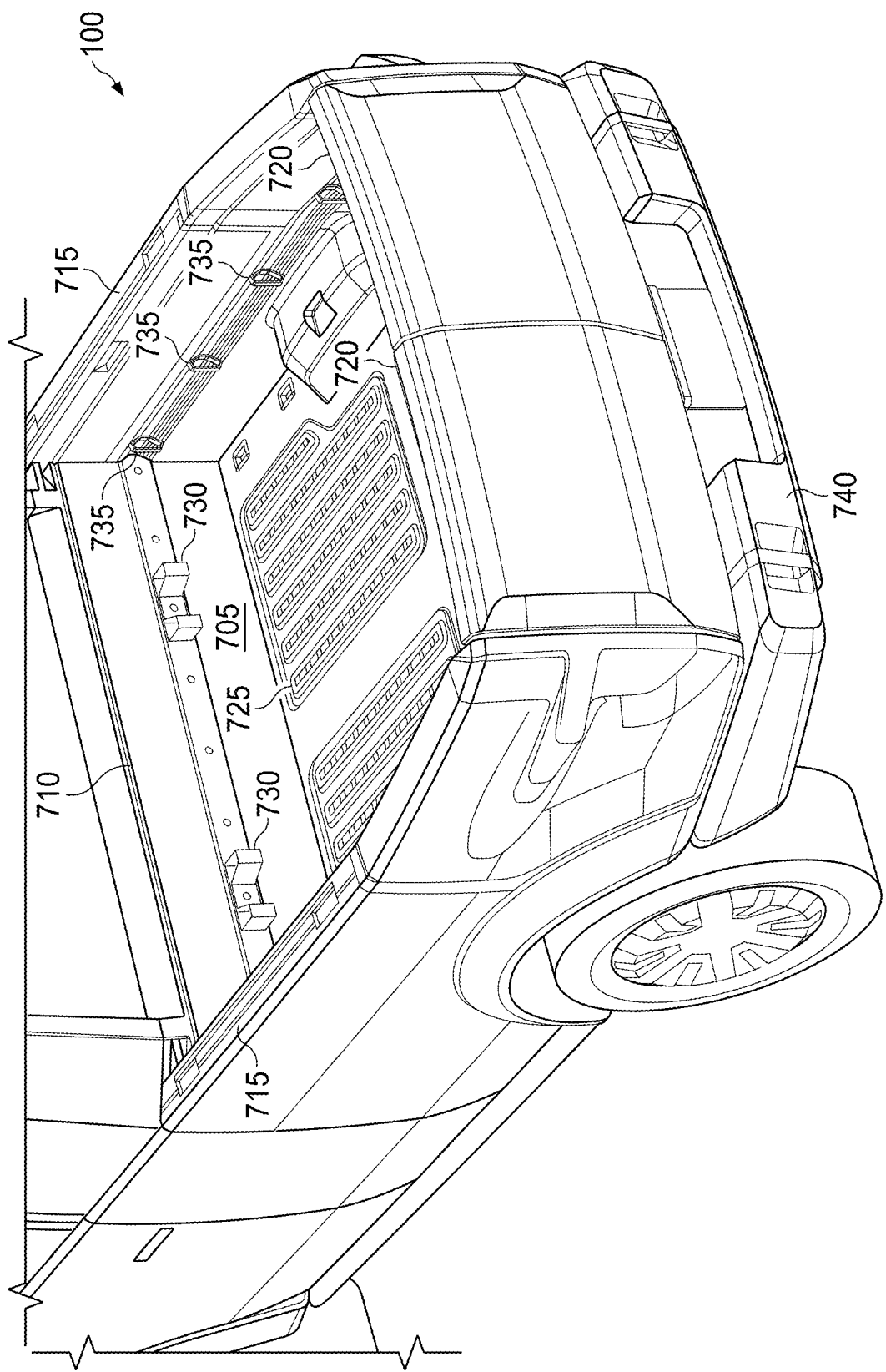
FIGS. 7-11 illustrate a pull-out bed extender on an electric vehicle according to embodiments of the present disclosure.

FIGS. 4-6 illustrate front cargo storage with a fold-down worktable on an electric vehicle according to embodiments of the present disclosure. The "frunk" (front trunk) includes a front gate 405 at the front of the electric vehicle 100, below the front window(s) 410 and above the front bumper 415, between two front headlights 420. The front gate 405 is mounted above the front bumper and skid plate of the electric vehicle 100. The front bumper includes integrated hook mounts for secure mechanical lines (ropes or chains) to the electric vehicle 100.

The front gate 405 may be released by pressing a nearby touch sensor panel on the body of the electric vehicle and, once released, rotates down from the closed position shown in FIG. 4 to the open position shown in FIGS. 5 and 6. The front gate 405, when in the closed position, covers and secures both a cargo storage area 425 for storage of tools and the like and a panel including one or more sets 430 of power outlets. The power outlets may include three-prong outlets receiving plugs for standard 110 volt (V) alternating current (AC) power and outlets receiving universal serial bus (USB) type A and/or type C connectors. A bottom 435 of the cargo storage area 425 may include or form a pad for wireless charging of power tools.

The side of the front gate 405 that faces into the cargo storage area 425 when the front gate 405 is closed faces up when the front gate 405 is open. Two panels 440 on that side of the front gate 405 form a work surface and are expandable from a retracted position shown in FIG. 5 to an expanded position shown in FIG. 6. Panels 440 may be mounted on slides and in some embodiment may be manually extended or retracted, either in conjunction with each other based on cooperative gearing or separately/individually. In some embodiments the front gate 405 may include one or more motors for driving the panels 440 between the extended and retracted positions, either in conjunction with each other or separately/individually. Fully extending the panels 440 increases the size of the work surface by a significant amount, up to double.

Pull-out Bed Extension: In one embodiment, the pickup truck bed is six feet long and can extend to a fully enclosed eight feet, allowing big items such as a four foot by eight foot sheet of plywood to easily fit inside. The pull-handle bed extension also helps with loading and unloading the truck. The extension pull-handle also serves as license plate holder. When the bed is extended, a second layer of tailgate doors can be swiveled out. The bed-extension also houses a secondary lamp, containing all tail lamp functions, so the truck can be driven while the bed space is maximized.

FIGS. 7-11 illustrate a pull-out bed extender on an electric vehicle according to embodiments of the present disclosure. The electric vehicle 100 includes a bed 705 bounded by a rear wall 710 of the vehicle's cabin, two siderails 715, and barn-door tailgates 720. The bed 705 is located above the rear bumper and skid plate of the electric vehicle 100. As with the front bumper, the rear bumper of the electric vehicle 100 includes integrated hook mounts.

The floor of the bed 705 includes a pegboard floor system for dividers (not shown) to be installed within the bed, partitioning the volume of the bed 705 into regions. Portions of the floor of the bed 705 may be covered by removable, magnetic bed mats. In the embodiment depicted, the bed 705 includes a bike mount 730 mounted on the rear wall of the vehicle's cabin and tie-down anchors or hooks 735 along the siderails 715. The siderails 715 may include illuminated power outlets on the bed wall. Covered openings in the bed floor provide access panels to on-board electronics.

Figure 8:
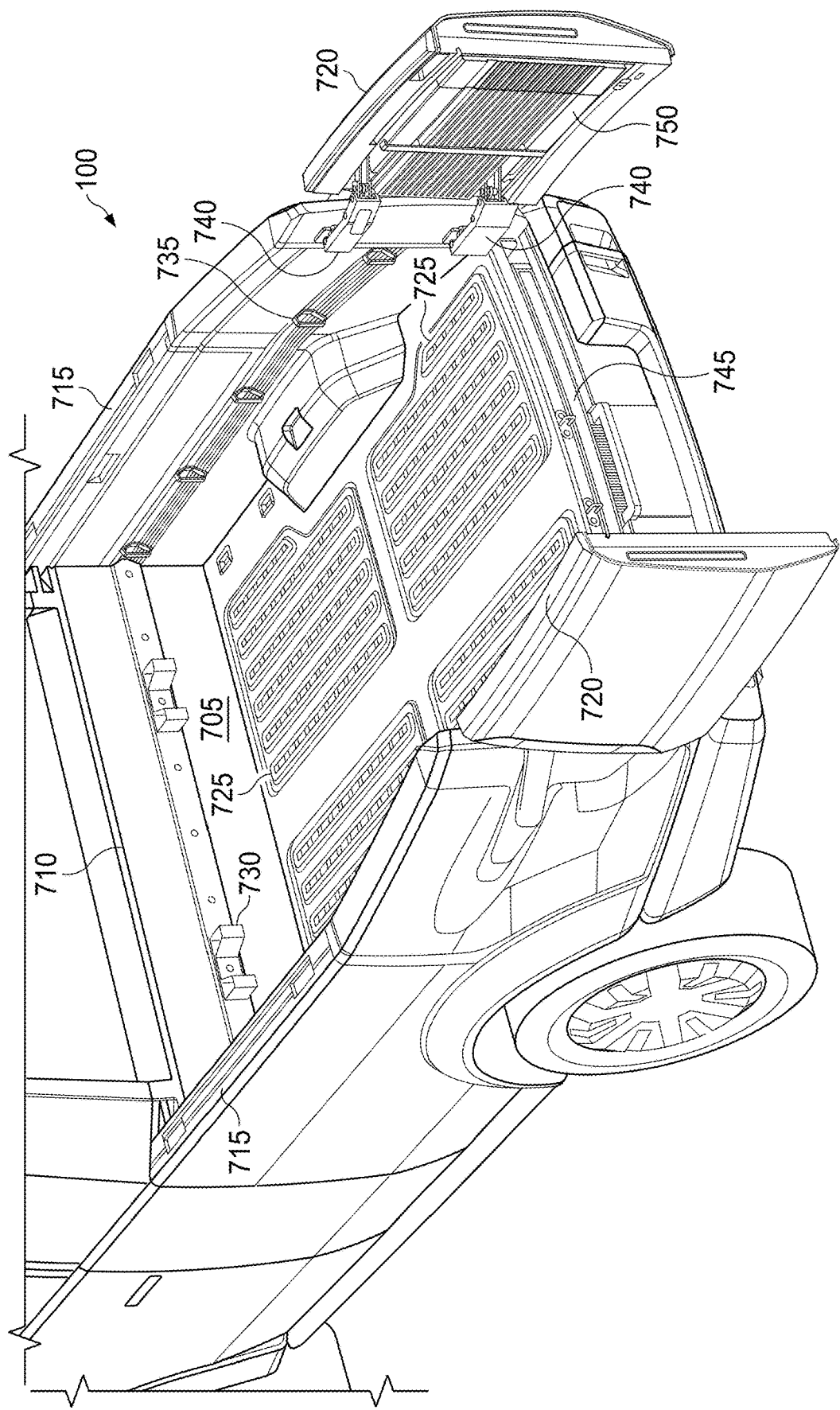
Figure 9:
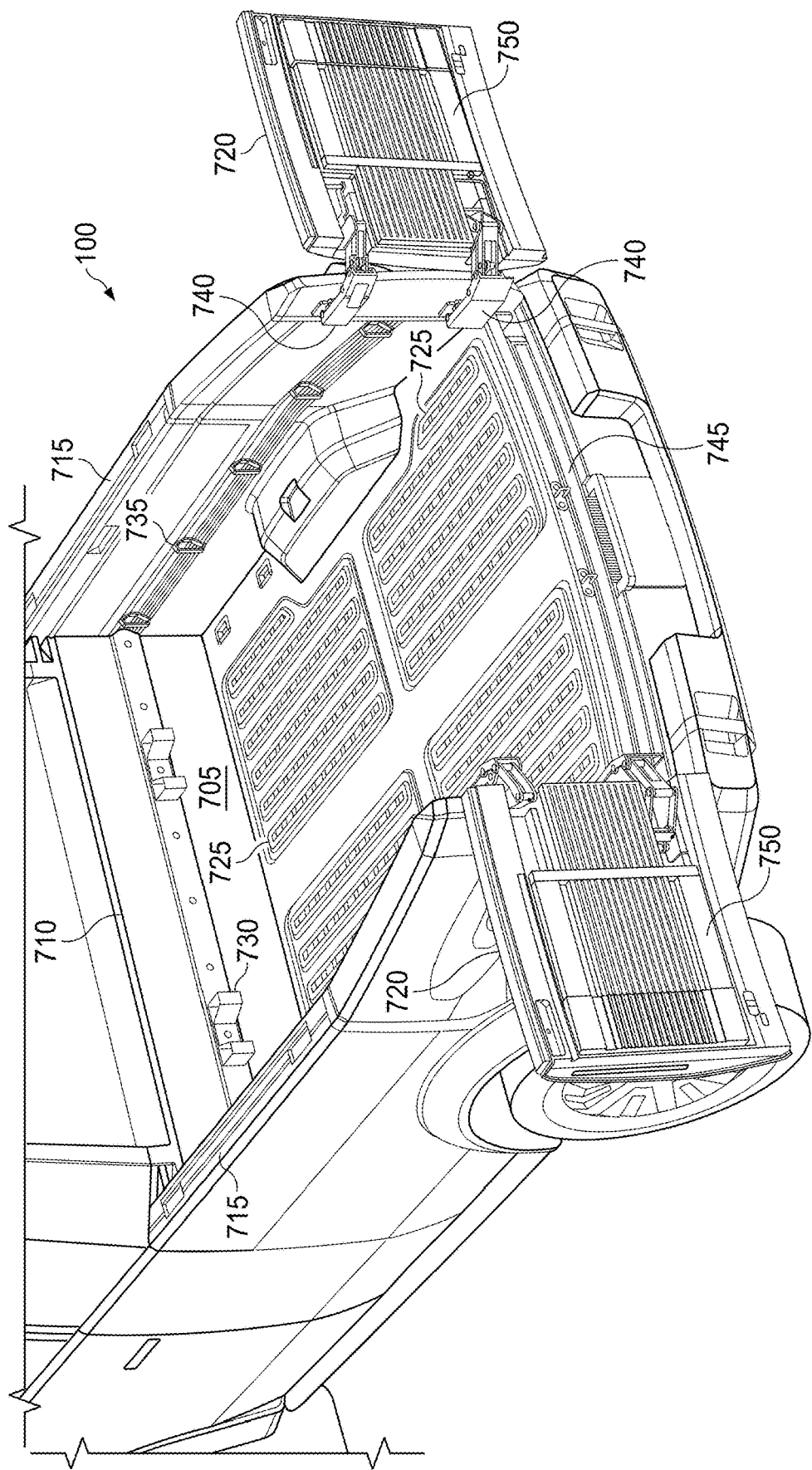
Figure 10:
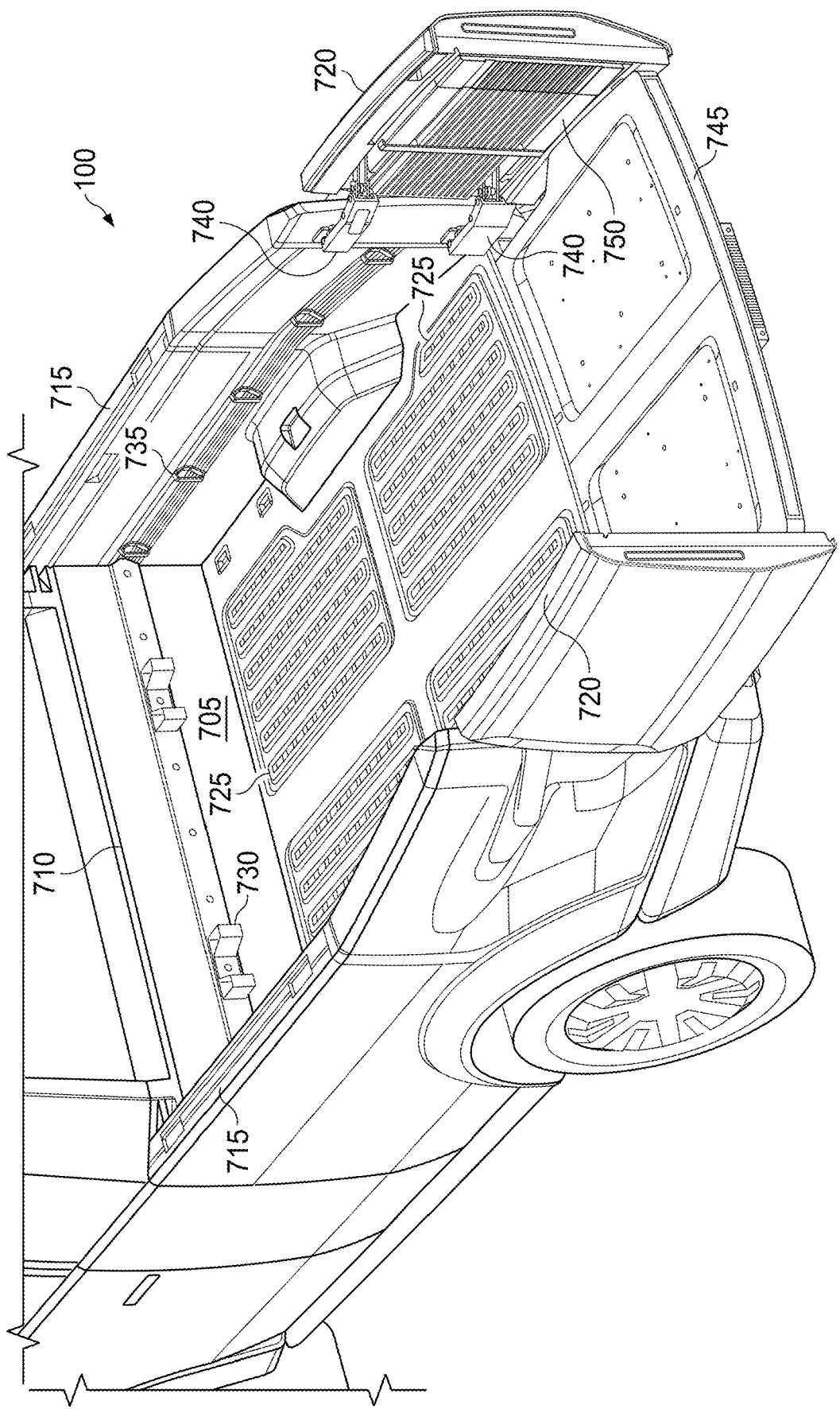
Figure 11:
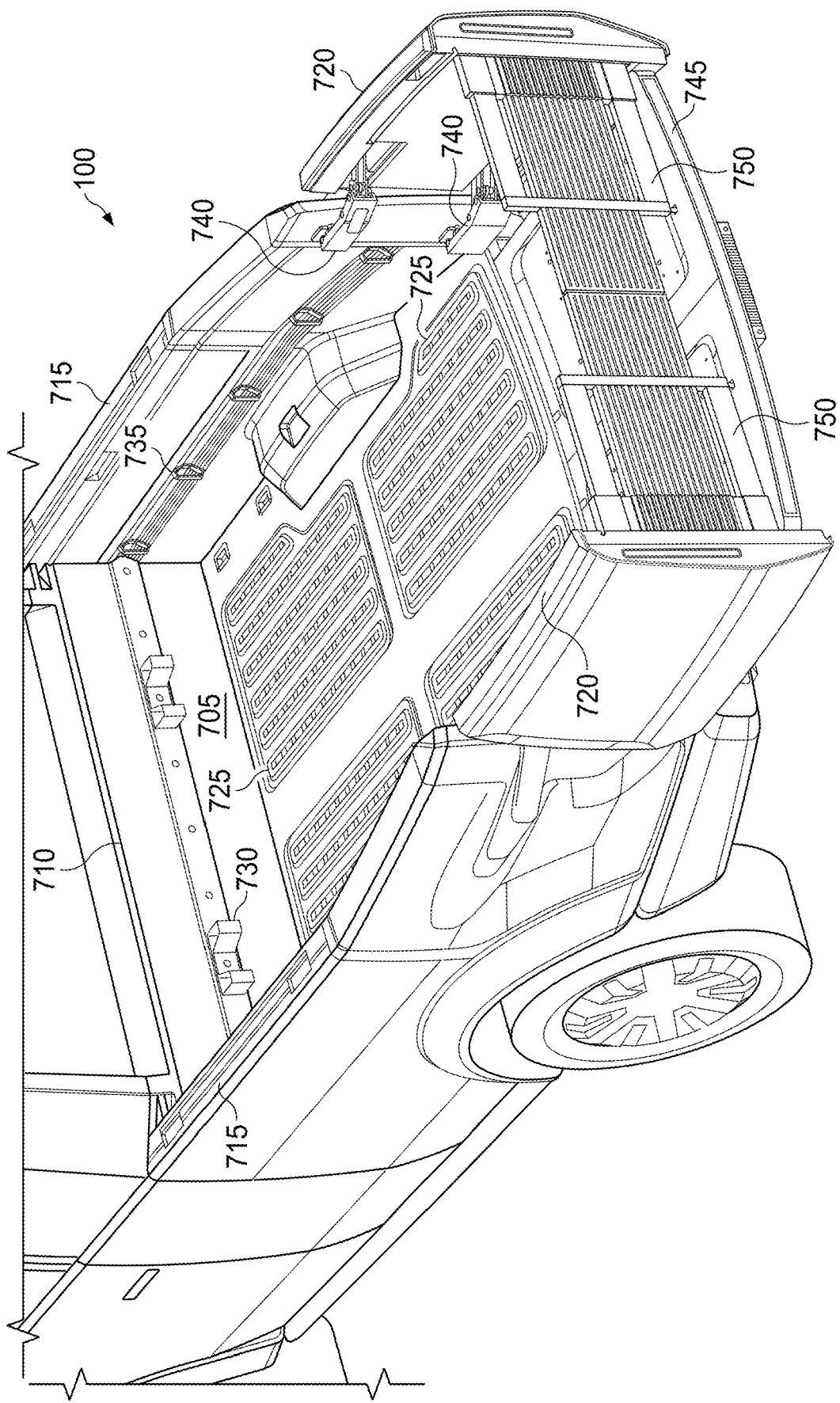

Barn-door tailgates 720 are each mounted on multi-position hinges 740 that stabilize (or "lock") in multiple positions. With multi-position hinges 740, the barn-door tailgates 720 may open from the closed position depicted in FIG. 7 to a 90° open position as shown in FIGS. 8 and 10-11 or to a 180° open position as shown in FIG. 9. When opened to one of those positions, barn-door tailgates 720 will remain in the respective 90° or 180° open position until acted on by sufficient force to overcome the mechanical resistance to movement from that position that is provided by the hinge design.

As described above, the bed 705 is equipped with a bed extender increasing the area of the bed 705 from approximately 4 feet by 6 feet, with the bed extender retracted, to at least approximately 4 feet by 8 feet. The bed extender 745 stows in a space slightly below the floor of the bed 705 and may be manually extended out from that stowed position, shown in FIGS. 8-9, to an extended position shown in FIGS. 10-11 using a pull handle provided on the bed extender 745. When the bed extender 745 is in the fully extended position shown in FIGS. 10-11, the barn-door tailgates 720 may be latched to the sides and/or corners of the bed extender 745, to mechanically secure both the extension of the bed extender 745 and the position of the barn-door tailgates 720. In addition, the license plate holder and at least some of the rear braking and signaling lights for the electric vehicle 100 are preferably mounted on the end of the bed extender 745, to be prominently visible when the bed extender is in the fully extended position.

Mounted on the interior surfaces of the barn-door tailgates 720 are magnetic fold-out inner tailgates 750. Inner tailgates 750 may be stowed in the position shown in FIGS. 8-10, aligned with and extending along the inner surfaces of barn-door tailgates 720. Inner tailgates 750 are mounted on hinges secured to the barn-door tailgates 720, and may be rotated out from the stowed position to the deployed position shown in FIG. 11 in which the inner tailgates 750 extend across the width of the bed. The ends of the inner tailgates 750 may magnetically engage to form a wall enclosing the space of the bed 705 when the bed extender 745 is in the deployed position, keeping cargo within the bed 705 from falling out when the electric vehicle 100 is in transit.

Flip-Down Side Tables: Both siderails of the electric vehicle 100 house a flip down table in two folding segments. Built into the side panel of the truck bed siderails 1215, the flip-down side table become a workbench with power outlets in close proximity.

Figure 12:
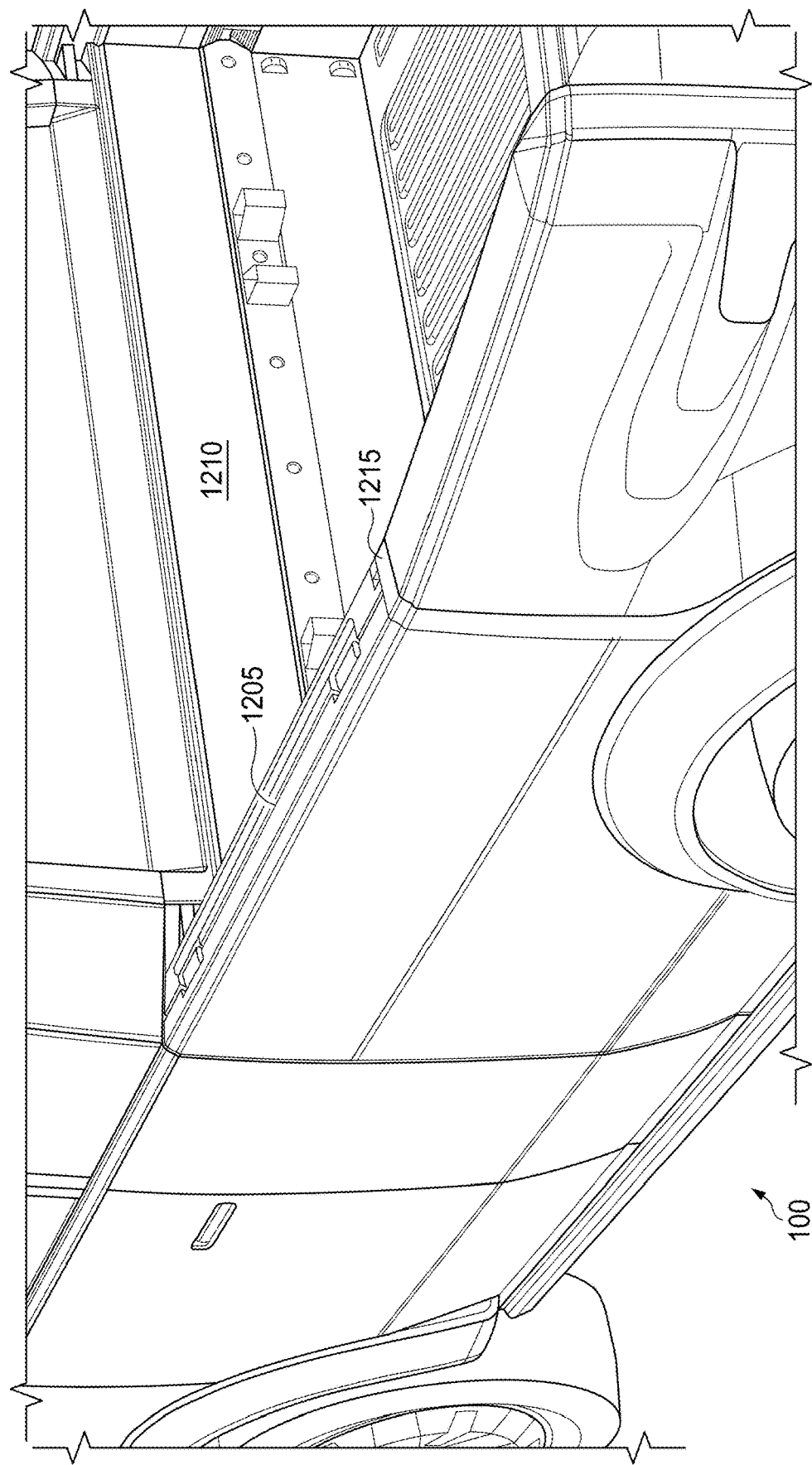
FIGS. 12-14 illustrate flip-down side tables on an electric vehicle according to embodiments of the present disclosure.
Figure 13:
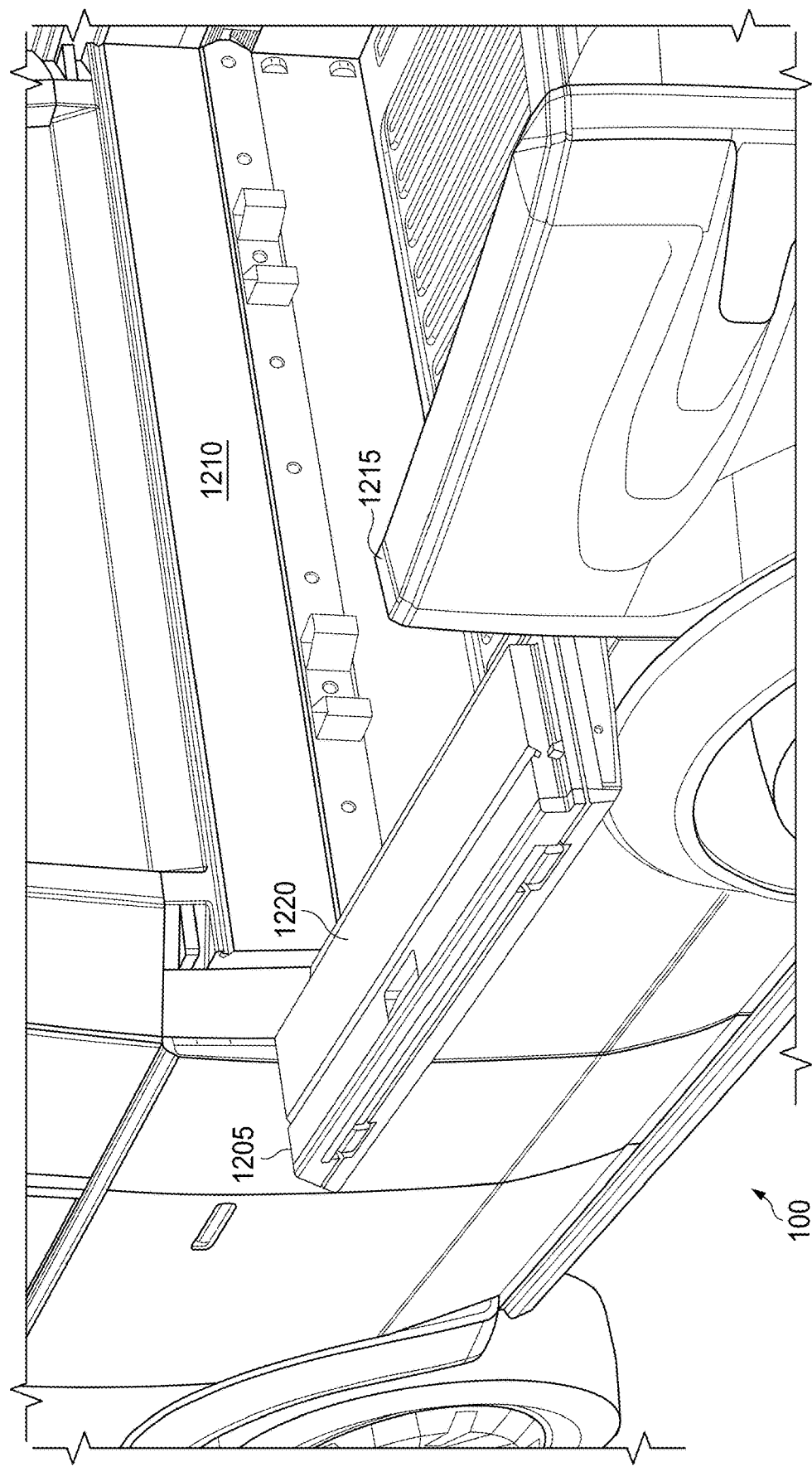
Figure 14:
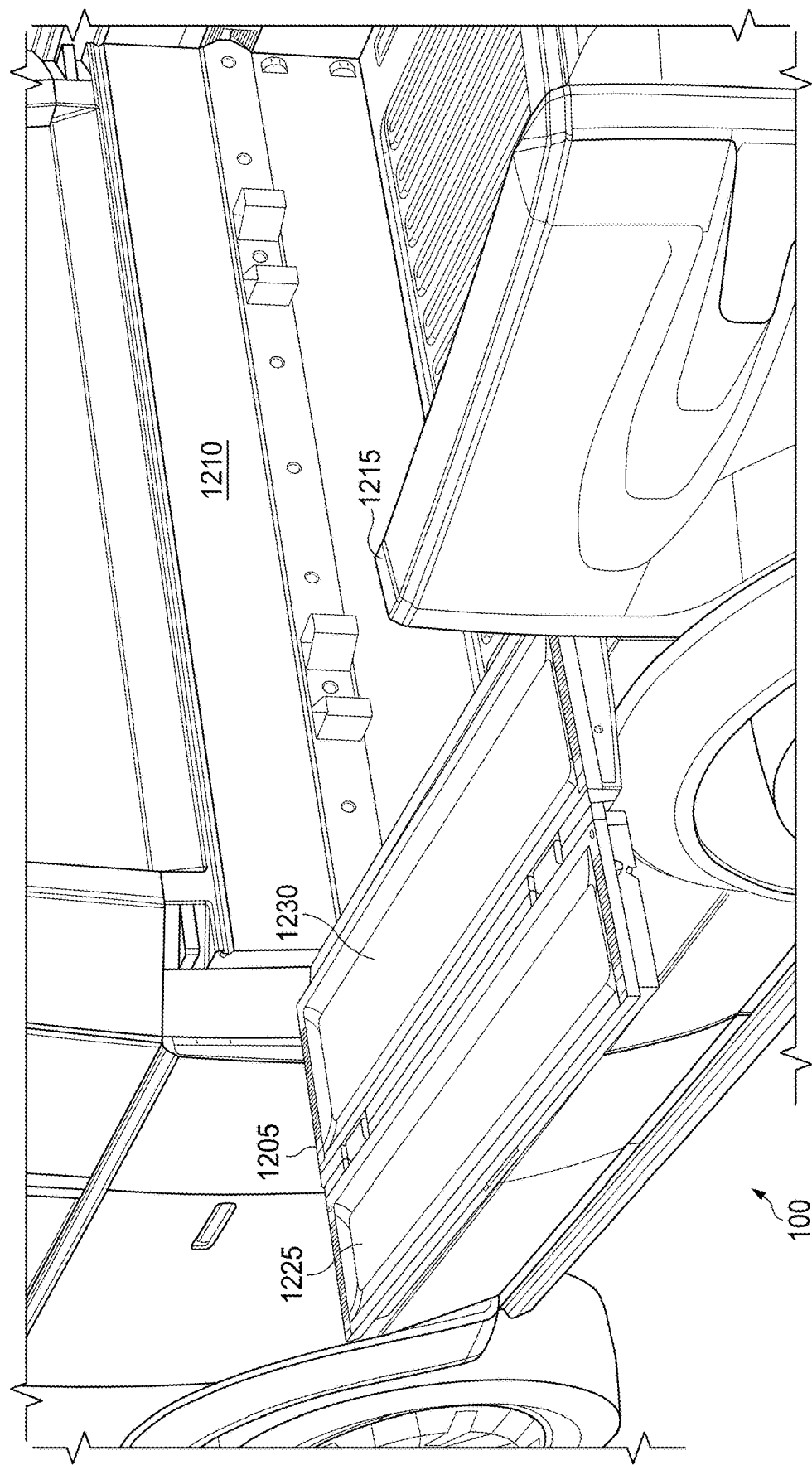

FIGS. 12-14 illustrate flip-down side tables on an electric vehicle according to embodiments of the present disclosure. For simplicity and clarity, the relevant structures on only one side of the electric vehicle 100 are depicted and described below. However, those skilled in the art will recognize that opposite side can includes mirror-image structures.

A portion 1205 of the siderails 1215 for the bed 1210 of the electric vehicle 100, normally latched in an upright (side table stowed) position as shown in FIG. 12, may be released to rotate downward and outward 90° to a deployed position shown in FIGS. 13-14. The deployed side table formed by rotation of the siderail portion 1205 includes a work surface 1220. In addition, the siderail portion 1205 is formed in hinged segments that can remain adjoining as shown in FIG. 13, or can be unfolded as shown in FIG. 14. The unfolded segments of the siderail portion 1205 include shallow recessed areas or depressions 1225, 1230 on the upper sides to retain small items, particularly those having a tendency to roll. The battered or slanted sides of the shallow recessed areas or depressions 1225, 1230 are surrounded by flat regions forming the periphery of the work surface for the respective segment of siderail portion 1205. The work surface formed by the deployed side table(s) is illuminated by lights also illuminating the bed 1210.

Side Step+Drawer: On the side of the vehicle there is a hidden step to allow quick and easy access to the truck bed. Underneath the step is a flexible storage area which can store items such as a custom made first aid kit, food cooler, lockable lap top storage and more. This space efficient feature is only possible due to the platform design of the electric vehicle 400 discussed above.

Figure 15:
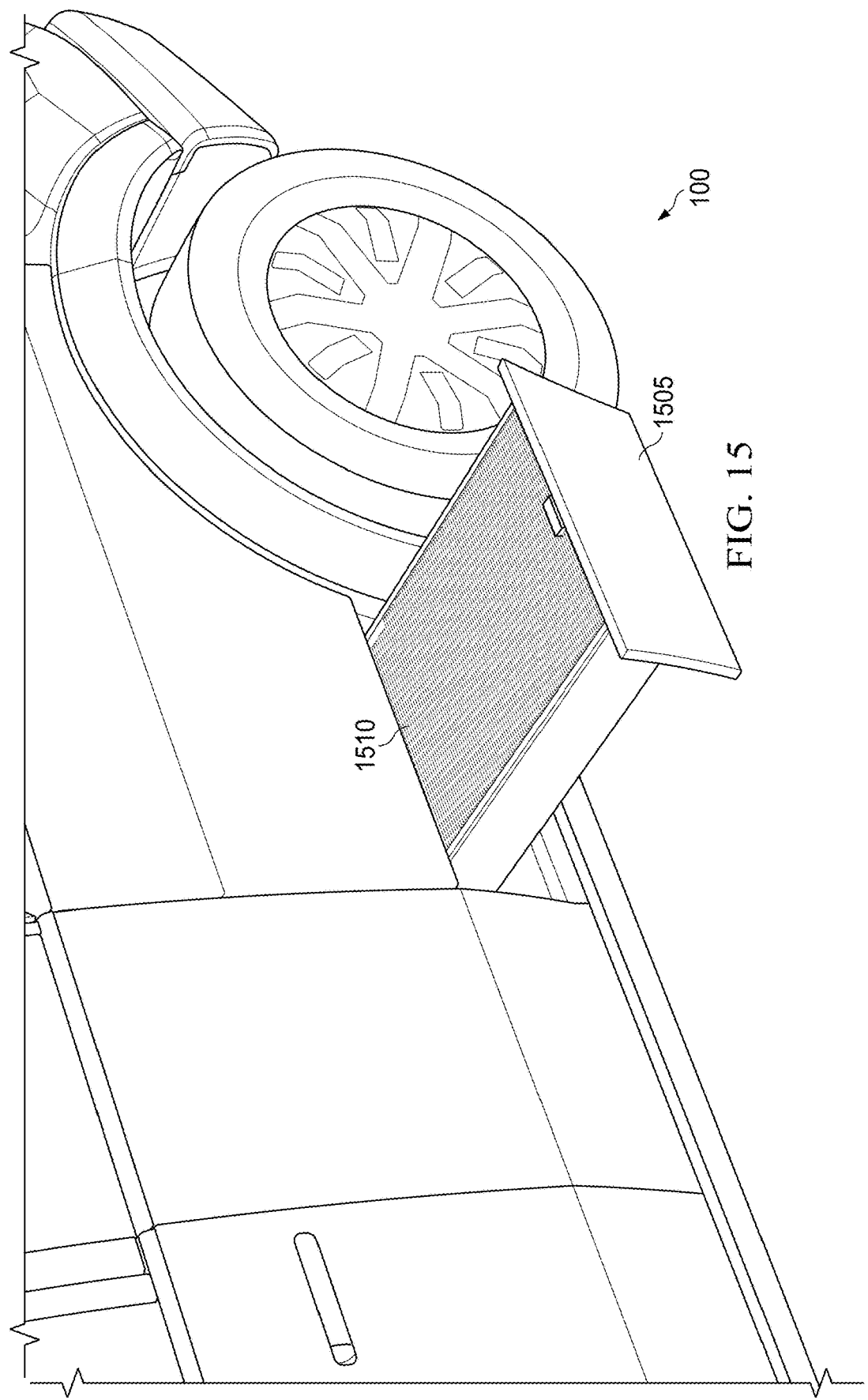
FIGS. 15-16 illustrate one side step and drawer on an electric vehicle according to embodiments of the present disclosure.
Figure 16:
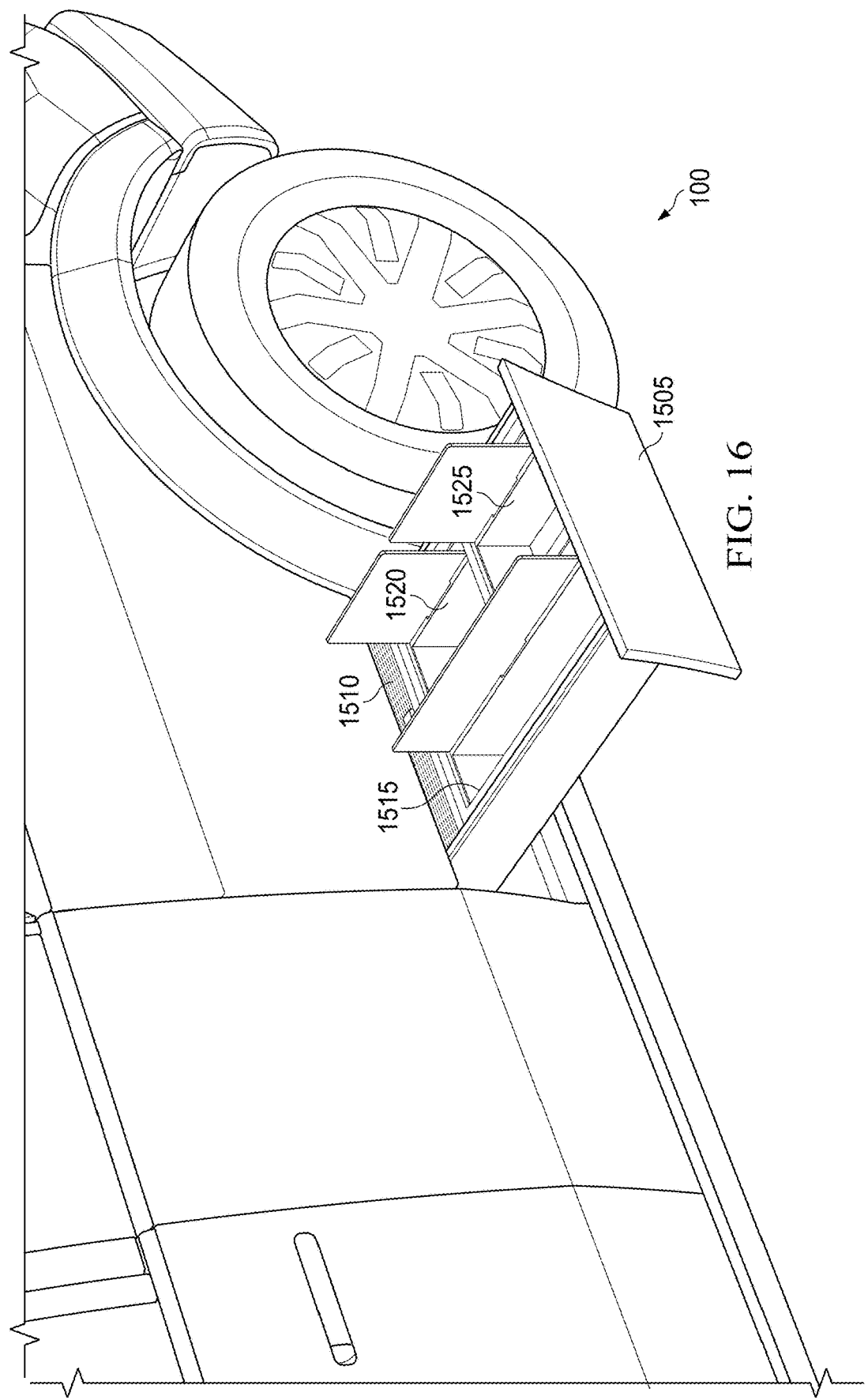

FIGS. 15-16 illustrate one side step and drawer on an electric vehicle according to embodiments of the present disclosure. As with the side tables, the relevant structures on only one side of the electric vehicle 100 are depicted and described below for simplicity and clarity. However, those skilled in the art will recognize that opposite side can includes mirror-image structures.

A portion 1505 of the sidewall for the electric vehicle 100, behind the cabin, in front of the rear wheel well and below the bed, comprises pop-out sidestep storage that opens via a "push-in, pop-out" mechanism. While the side step is depicted an extended or deployed position in FIGS. 15-16, those skilled in the art will recognize that the surface 1505 forming one end of the side step will be flush with adjoining regions of the sides of the electric vehicle 100 when the side step is in the retracted or stowed position.

A roll top cover 1510 is located on the upper surface of the side step. The roll top cover 1510, provides an anti-skid surface onto which a person may step in order to better reach items either in the bed or in the rack mounted on top of the vehicle's cabin. The roll top cover 1510, shown fully extended in FIG. 15, may be pushed back toward the centerline of the electric vehicle 100 as shown in FIG. 15 to provide access to covered storage 1515, 1520, 1525 within the side step.

Modular Bed with Space Dividers: The truck bed can be modular with the use of pegboard space divider system noted above, which is designed to keep items separate and secure from rolling around. The bed wall also incorporates modular chocks and tie-down anchors/hooks to secure bikes, ladders, large equipment and other materials.

Multi-Accessory Charge Port: The pickup truck can double as a powerplant with exportable power accessible on all sides of the vehicle that can last all day for tools and devices, which only has a 10% impact on vehicle range.

Integrated Overhead+Bed Perimeter Lighting: The third brake light, located near the roof of the vehicle's cabin above the rear window, doubles as an overhead light to see inside the cargo bed at night. The vehicle is also equipped with a perimeter light on all sides of the bed wall for added visibility.

Roof Rack: The pickup truck has optional roof racks in variable sizes on top of the vehicle cabin for added cargo storage. The roof rack is easily accessible from the bed or via the side step.

Camper Shell: The pickup truck is designed to accommodate a variety of camper shells for as many use cases as possible.

The pickup truck electric vehicle 400 described herein is based on a multi-purpose platform architecture, which is reusable for other classes of electric vehicles and which functionally integrates all the critical components of an electric powertrain to be as flat and efficient as possible. Traditional electric vehicles platforms have power units, shock towers and mechanical steering columns that protrude into the vehicle and take up space. By incorporating steer-by-wire and other space-saving technologies, the thin platform of the present disclosure has no need for an engine compartment, allowing the design to include a flatbed size comparable to America's best-selling pickup truck on a smaller footprint. This makes the vehicle easier to maneuver and more convenient to drive and park in any country.

Vehicle specifications for the pickup truck include:
Dual or rear motor configurations
Up to 600 horsepower (hp) and 550 pound-feet (lb-ft) of torque with dual motors
Vehicle payload of 1800 pounds (lbs)
200+ miles of battery range
Steer-by-wire and brake-by-wire technology
Length overall (LOA): 4677 millimeter (mm); with bed extension deployed: 5400 mm
Width: 1980 mm (w/mirrors: 2209 mm)
Height: 1920 mm (w/roof rack: 2085 mm)
Bed width×length: 1627 mm×1817 mm (w/extension: 1627 mm×2600 mm)
Bed depth: 522 mm
Roof rack width×length: 1230 mm×1360 mm The pickup truck is designed to be cab-forward and space efficient, with massive cargo capacity on a small footprint. Only possible due to the flexible platform and steer-by wire designs, the passenger compartment has been pushed forward to maximize driver visibility. The pickup has added stance and durability with increased wheel spats to support larger wheels, better stability and to give the electric vehicle a rugged profile. Advanced lighting technology provides adaptive safety. Beyond just storage, the front surface of the vehicle has been extended to better protect the headlights and windscreen. The bumper systems are designed for maximum functionality and durability with integrated tow hooks and metal skid plates on both the front and rear. The vehicle's fog lamps are also integrated seamlessly into the bumper design to offer the driver additional visibility and safety. Lined with trim and materials selected for durability, the extended cab vehicle has two seats in the front with a customizable rear compartment that can accommodate two additional seats or support additional purpose-built use-case configurability.

With its features, utilitarian design, and compact maneuverability, this vehicle is suitable for everyone on the road, dirt road or off-road, and is purposefully designed to help everyday people be more productive and enjoy a return on capital from the vehicle, putting money back into the pockets of the consumers.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A vehicle body, comprising:
 a front trunk having a cover within an interior surface forming a worktable when the cover is rotated down;
 an extendable bed and a pair of barn door tailgates each having an inner gate rotatable about a connection to an end of a respective one of the barn door tailgates, the barn door tailgates and inner gates selectively movable to enclose an extended cargo area formed when the extendable bed is in an extended position;
 a sidewall table formed by folding down a sidewall portion of a bed for the vehicle body and unfolding hinged segments of the sidewall portion; and
 a side step formed by a sliding drawer having a retractable cover with an anti-skid surface.

2. The vehicle body according to claim 1, wherein the cover may be selectively rotated up to a closed position and rotated down to an open position, the cover comprising:
 panels on the interior surface of the cover, each of the panels selectively movable between a retracted position and an extended position, wherein the interior surface and the panels form an extended work surface when the panels are in the extended position.

3. The vehicle body according to claim 1, wherein the extendable bed comprises a bed extender slidable between a retracted position and the extended position,
- wherein the barn door tailgates are each selectively movable between each of a closed position, a partially open position, and a fully open position,
- wherein each inner gate is selectively movable around the connection between a stowed position and a deployed position, and
- wherein the barn door tailgates and the inner gates enclose the extended cargo area when the bed extender is in the extended position, the barn door tailgates are each in the partially open position, and the inner gates are each in the deployed position.

4. The vehicle body according to claim 1, wherein the sidewall portion of the bed selectively movable between a closed position oriented in alignment with a remainder of a sidewall of the bed and an open position extending outward from the sidewall to form a work surface, and
- wherein the hinged segments are configured to be selectively unfolded to form an enlarged work surface.

5. The vehicle body according to claim 1, wherein the sliding drawer is configured to be selectively pulled out from a sidewall of a bed for the vehicle body, the retractable cover forming a step surface and covering storage space within the drawer.

6. A front trunk for a vehicle body, the front trunk comprising:
- a storage space located at a front of the vehicle body;
- a worktable surface on an interior of a movable cover over the storage space; and
- a cover selectively movable between a closed position and an open position, the cover comprising panels on the worktable surface, each of the panels selectively movable between a retracted position and an extended position, wherein the panels and an underlying portion of the worktable surface form an extended work surface when the panels are in the extended position.

7. The front trunk according to claim 6, further comprising:
- electrical outlets within a surface of the storage space.

8. The front trunk according to claim 6, further comprising:
- a wireless charging pad on a bottom surface of the storage space.

9. The front trunk according to claim 6, wherein each of the panels is individually movable between the retracted position and the extended position.

10. The front trunk according to claim 7, wherein the electrical outlets comprise a universal serial bus (USB) connection.

11. A cargo bed for a vehicle body, the cargo bed comprising:
- a bottom surface extending rearward from a cabin of the vehicle body;
- sidewalls on side edges of the bottom surface;
- a bed extender for the bottom surface, wherein the bed extender is slidable between a retracted position and an extended position; and
- barn door tailgates each connected to one of the sidewalls, each of the barn door tailgates selectively movable between each of a closed position, a partially open position, and a fully open position,
- wherein the barn door tailgates each comprise a body and an inner gate selectively movable between a stowed position against a respective body and a deployed position extending from an end of the respective body, and
- wherein the bodies of the barn door tailgates and the inner gates enclose an extended region of a bed when the bed extender is in the extended position, the bodies of the barn door tailgates are each in the partially open position, and the inner gates are each in the deployed position.

12. The cargo bed according to claim 11, wherein the bed extender, in a retracted position, is positioned below the bottom surface.

13. The cargo bed according to claim 11, wherein the bed extender comprises a pull handle for manual movement between the retracted position and the extended position.

14. The cargo bed according to claim 11, wherein the barn door tailgates each latch in the closed position and stabilize in each of the partially open position and the fully open position.

15. The cargo bed according to claim 11, wherein the inner gates are pivotably mounted within the bodies of the barn door tailgates.

16. A vehicle body, comprising:
- a sidewall of a cargo bed, wherein a portion of the sidewall is selectively movable between a closed position oriented in alignment with the sidewall and an open position extending outward from the sidewall to form a first work surface comprising an interior surface of the sidewall portion,
- wherein the sidewall portion comprises hinged segments configured to be selectively unfolded to form an enlarged work surface comprising internal surfaces of the sidewall portion when the sidewall portion is in the closed position.

17. The vehicle body according to claim 16, wherein the hinged segments configured to be selectively unfolded to form an enlarged work surface.

18. A vehicle body, comprising:
- a sliding drawer retractably mounted within a sidewall of a cargo bed,
- the sliding drawer configured to be selectively pulled out from the sidewall to an open position and pushed inward toward a centerline of the vehicle body to a closed position,
- the sliding drawing having an end surface flush with adjoining surface of sides of the vehicle body when in the closed position,
- the sliding drawer including a roll top retractable cover having an anti-skid surface forming a step and covering storage space within the sliding drawer.

19. The vehicle body according to claim 18, wherein the sliding drawer is configured to be pushed in to initiate outward movement.

20. The vehicle body according to claim 18, wherein the storage space is divided into compartments each including a compartment cover.

* * * * *